United States Patent [19]

Örtenheim

[11] 4,152,633
[45] May 1, 1979

[54] ELECTRICALLY DRIVEN VEHICLE

[75] Inventor: Björn Örtenheim, Uppsala, Sweden

[73] Assignee: Modern Production AB, Uppsala, Sweden

[21] Appl. No.: 515,059

[22] Filed: Oct. 15, 1974

[30] Foreign Application Priority Data

Oct. 12, 1973 [SE] Sweden .................................. 7313915

[51] Int. Cl.² ............................................. H02P 7/14
[52] U.S. Cl. ................................... 318/376; 318/139; 318/440
[58] Field of Search ................. 318/139, 440, 442, 376

[56] References Cited

U.S. PATENT DOCUMENTS

| | | | |
|---|---|---|---|
| 1,776,317 | 9/1930 | Huguenin | 318/139 |
| 3,241,019 | 3/1966 | Gross | 318/139 |
| 3,387,194 | 6/1968 | Banks | 318/139 |
| 3,546,548 | 12/1970 | Wouk | 318/139 |
| 3,696,279 | 10/1972 | Gyori | 318/139 |
| 3,702,959 | 11/1972 | Gloan | 318/139 |
| 3,728,599 | 4/1973 | Minami | 318/139 |
| 3,786,206 | 1/1974 | Kurimsky | 200/16 D |

*Primary Examiner*—B. Dobeck
*Attorney, Agent, or Firm*—Spencer & Kaye

[57] ABSTRACT

In order to drive an electrically operated vehicle provided with an electric drive motor supplied with energy by a plurality of rechargeable batteries carried by the vehicle, in a manner to achieve high electric power utilization efficiency, the feed voltage for the driving motor is increased in steps by successive connection of a progressively increasing number of batteries in series with the driving motor, a load-dependent steady state of the motor corresponding to each feed voltage and to a constant rate of motor rotation, and the batteries are switched to provide a lower feed voltage when the motor, and thus also the vehicle, has achieved a selected steady state, at which time the driving motor, due to the dynamic inertia of the moving vehicle, acts as a generator which changes the batteries until the voltage generated by the motor acting as a generator drops to the lower feed voltage value, whereby a large portion of the energy used for propelling the vehicle is recovered.

6 Claims, 4 Drawing Figures

4,152,633

ELECTRICALLY DRIVEN VEHICLE

BACKGROUND OF THE INVENTION

The present invention relates, on the one hand, to a method of operating an electrically driven vehicle which is driven by an electric motor fed by vehicle-borne batteries and, on the other hand, to a vehicle of this kind. Vehicles of this type are known in which the effect supplied to the motor is varied by means of resistors and/or gear boxes which means that an important part of the available battery energy is lost in the form of transmission losses in the gear box and in form of heat energy developed in the resistors.

In controlling the speed of the vehicle it is also known to make use of thyristor means with the aid of which the power supply to the motor is controlled. These thyristor means form part of complicated and very expensive control circuits which, for example, sense the load of the vehicle and control the power supply to the driving motor in dependence on the sensed load, the cost of such thyristor means and appertaining control circuits thus becoming prohibitively high. While by such measures the speed control system is improved and thereby also to a certain extent the efficiency, battery energy is still used in the gear box and/or resistors.

SUMMARY OF THE INVENTION

The present invention attempts to remove the above-indicated deficiencies. The method of the invention is characterized in that the feed voltage of the driving motor is increased in steps by successive connection of more and more batteries in series with the driving motor, a load-depending steady state of the motor corresponding to each feed voltage, said steady state thus corresponding to a substantially constant number of motor revolutions, and that the batteries are switched to a lower feed voltage as soon as the motor and thereby also the vehicle have achieved an arbitrary steady state, the driving motor now due to the inertia of the vehicle serving as generator charging the batteries until the voltage over the generator/motor due to the consequential retardations goes down to the voltage for said lower feed voltage, whereby a great part of the energy used for the propulsion of the vehicle is regenerated. Thanks to the voltage switching and the consequential regeneration of energy the action radius is increased by up to 50 percent in comparison with a corresponding vehicle in which the power output is continuous. All energy taken from the batteries is used for the propulsion of the vehicle. A great part of the energy used is recovered, for example during down-hill driving and during such periods when the speed of the vehicle is reduced by braking or due to other factors. As soon as said lower feed voltage is acting over the generator/motor the way of operation of the motor is automatically changed and the motor again starts to drive the vehicle.

The vehicle according to the invention is characterized by a speed control member adapted to assume a number of control positions in succession and switches controlled by the speed control member and adapted for each control position to connect the batteries, on the one hand, mutually in a pattern balanced in respect to the power discharge from each battery and, on the other hand, commonly to the driving motor to feed said motor with a feed voltage successively increasing for each successively increasing control position, whereby the speed of the vehicle is increased.

Due to the fact that the speed control member is adapted to assume the various control positions in succession the result is obtained that each battery always is charged equally when the speed of the vehicle is reduced while at the same time the speed control member is brought to a control position corresponding to a lower feed voltage.

Due to the fact that for each control position the power discharge is equal from each battery the useful life of every individual battery is increased and the maintenance and charge is facilitated and simplified.

Moreover, it is possible to use a thyristor element having a simple load-independent control circuit in connection with the vehicle according to the present invention. The thyristor member has a separate trigger circuit for pulse control of the control of the thyristor member. The anode and cathode of the thyristor member are adapted to be inserted by the switching means in a series circuit with the driving motor and the batteries during periods when power is taken from the batteries thereby reducing the power discharge from the batteries, but to be shunted by the switching means during periods when the batteries are charged thereby enabling the entire available charging energy to be fed into the batteries.

The thyristor pulse control of the motor current yields an important increase of the action radius of the vehicle. For, the motor current obtains the shape of short current pulses. Between the current pulses no energy is taken from the batteries which thus obtain short but frequently recurring idle periods or high-frequency idle periods. Due to the fact that the current discharge from the batteries thereby is reduced the batteries work on a level which is considerably more favorable in respect to useful life in comparison with continuous discharge of current. In addition the power discharge itself from the batteries will of course be decreased. These idle periods in the feed current flow, however, do not entail power losses at the motor because they are compensated by the own inertia of the motor during rotation.

BRIEF DESCRIPTION OF THE DRAWINGS

The invention will be described in detail by reference to the attached drawings, in which.

DESCRIPTION OF THE PREFERRED EMBODIMENT

Figure 1:
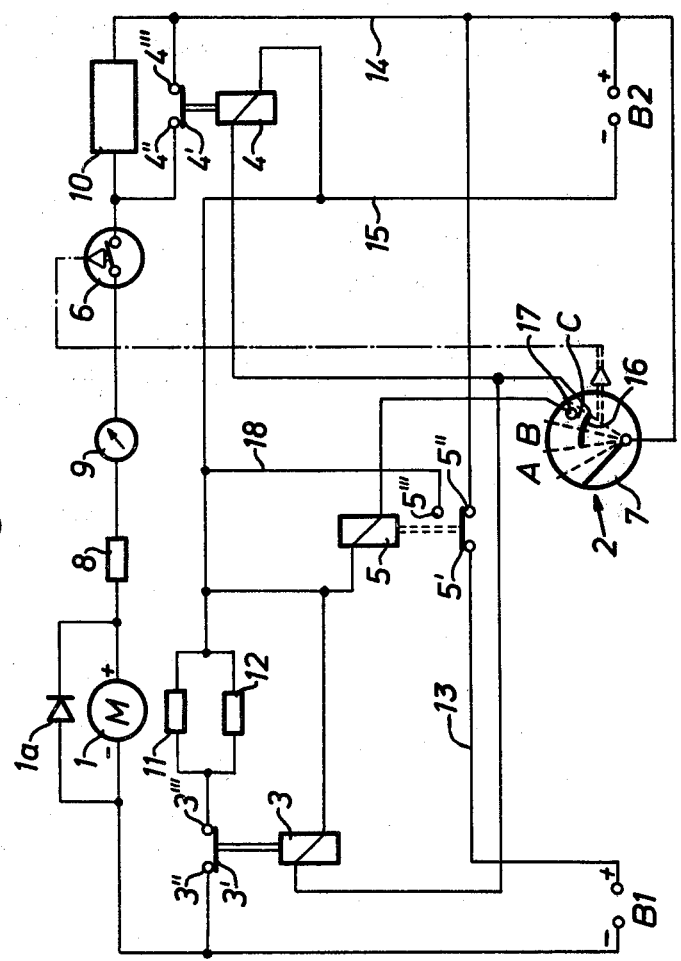
FIG. 1 is a circuit diagram of one embodiment.

In FIG. 1 there is shown a circuit diagram corresponding to one embodiment of the invention. An electric D.C. motor 1 with the characteristics 24 Volts, 750 Watt is driven from two batteries B1 and B2 of 12 Volts, 76 Amp.-hours each. A diode 1a is connected in parallel to the motor. The batteries may for example be mounted in the lower portion of the frame of a motor bicycle not shown. A speed control member 2 having three control positions A, B, C controls switching means 3, 4, 5 with the aid of which the batteries are interconnected in different patterns mutually and to the motor. The switching means in this case are two normally closed cut-off relays 3 and 4 and a switching relay 5. Relays 3 and 4 each have a movable contact 3', 4' and two fixed contacts 3", 3''' and 4", 4''' respectively. The switching relay 5 comprises a switching contact 5' which is movable between two contacts 5" and 5'''. A main current switch 6 is ganged to a slide contact 7 in the speed control member. In series with the motor and the positive pole of the battery B2 a fuse 8, an ammeter 9 and a thyristor member 10 are connected in succession. A parallel combination of two thermofuses 11, 12 is series connected between the fixed contact 3''' of relay 3 and the negative pole of the battery B2.

The vehicle is at a standstill and the main switch is disconnected in the position shown in FIG. 1. The main switch is actuated and the speed control member 2 then is in, or is brought into, control position A in which the positive pole of battery B2 is connected to the positive pole of battery B1 via a conductor 13 and to the positive pole of the motor via the following path: a conductor 14, contacts 4''', 4', 4", the closed main switch 6, the ammeter 9 and the fuse 8. The negative pole of battery B2 is connected to the negative pole of battery B1 and also to the negative pole of the motor via the following path: conductor 15, the parallel combination 11, 12 and contacts 3''', 3' and 3". Thus the batteries are connected in parallel, the motor is fed with 12 Volts and the vehicle accelerates up to "half speed" forward.

Thereafter the speed control member is adjusted to position B causing the slide contact 7, which is connected to the positive pole of battery B2 to come into contact with a bar 16. Thereby the armature winding of each of relays 3 and 4 is connected in series with battery B2 and the movable contacts 3' and 4' break contact with the fixed contacts 3", 3''' and 4", 4''' respectively. When, thereafter, the speed control member 2 is adjusted to control position C, slide contact 7 will come into contact with a contact 17 connected to the one connecting terminal of the armature of the switching relay 5, the other connecting terminal of which is connected to the negative pole of battery B2. Hereby the switching relay 5 is actuated and the movable contact 5' thereof is brought into contact with the fixed contact 5'''. The negative pole of battery B2 is now connected to the positive pole of B1 via the following path: 15, 18, 5''', 5' and +B1. The mutually series-connected batteries are also in series with the motor according to the following path: 14, 10, 6, 9, 8, 1 and −B1. Now the motor is fed with current pulses having an amplitude of 24 Volts and will accelerate up to "full speed" forward.

Assume now that the driver returns the speed control member to the control position A while the vehicle is going full speed forward on a level surface. Then, at first, relay 5 will return to its state of rest and thereafter relays 3 and 4 will do the same. Thus, the batteries will be connected in parallel (12 Volts) while the motor now delivers a voltage which initially is 24 Volts and which progressively goes down to 12 Volts as the vehicle is being retarded. Thus, during this time the motor will charge the batteries (bypassing the thyristor member 10). When the voltage across the motor has gone down to 12 Volts the motor again starts drawing current from the batteries.

Figure 2:
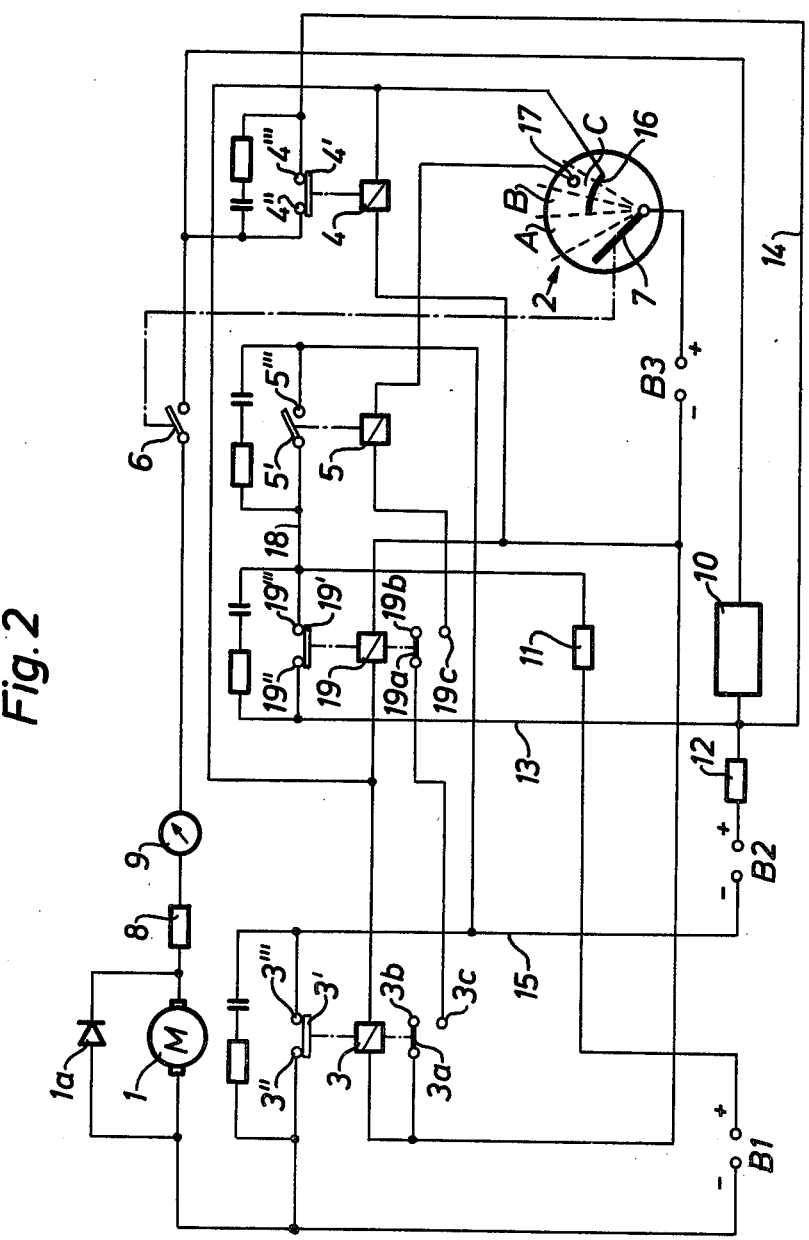
FIG. 2 is a circuit diagram of another embodiment.

In FIG. 2 there is shown another embodiment of the invention. Components shown in FIG. 2 and corresponding to similar components in FIG. 1 have been given the same reference designations as in FIG. 1. The differences in comparison with the circuit according to FIG. 1 reside in that the armature windings of the relays in this case are operated from a separate battery B3 which is not used for driving the motor. Relay 3 has been complemented by a relay 19 and these relays have additional contacts 3a-c and 19a-c respectively which, so to speak, form an AND-gate for operation of the armature windings of relay 5 with the aid of which batteries B1 and B2 are connected in series with each other when the slide contact is in the control position C. This prevents B1 and B2 to be connected in series with each other before the parallel connection between B1 and B2 is broken. As for the rest, the circuit operates in the same way as the circuit according to FIG. 1. When the speed control member is brought from cut-off position to position A the positive pole of B2 will be connected to the positive pole of B1 via 13, 19", 19', 19''', 11. The negative pole of B2 is connected to the negative pole of B1 via 15, 3''', 3', 3". Finally, the negative pole of B1 is connected to the positive pole of B2 via 1, 8, 9, 6, 4", 4', 4''', 14.

When the speed control member is shifted from position A to position B relays 3, 19 and 4 are actuated and contacts 3', 19' and 4' will be disconnected while at the same time the movable contacts 3a and 19a change position from 3b and 19b to 3c and 19c respectively whereby the AND-gate formed by these contacts will be closed. Moreover, the parallel-connection of batteries B1 and B2 will be broken. When finally the speed control member is brought to position C, the armature winding of relay 5 will be actuated through the following path: +B3, 7, 17, 5, 19c, 19a, 3c, 3a and −B3. The movable contact 5' thus moves into engagement with 5''' and batteries B1 and B2 are series-connected according to the following path: +B2, 10, 6, 9, 8, 1, −B1, +B1, 11, 19''', 18, 5', 5''', −B2, +B2. The motor operates at full speed and if now the speed control member is returned to position A batteries B1 and B2 will be charged in the same way as described above.

It will be understood that the number of batteries may be increased which in turn as a rule equally means an extension of the number of switching means used. If for example six 12 Volts batteries are used, the motor may be fed with the following voltage combinations corresponding to individual control positions of the speed control member;

12 Volts (6 parallel-connected groups of 1 battery each)

24 Volts (3 parallel-connected groups of 2 series-connected batteries each)

36 Volts (2 parallel-connected groups of 3 series-connected batteries each)

72 Volts (6 series-connected groups each comprising 1 battery).

It is often suitable that the batteries from which power is drawn are equally loaded. Thus, for example it is unsuitable to connect a group comprising 4 series-connected batteries in parallel with a group comprising 2 series-connected batteries.

Figure 3:
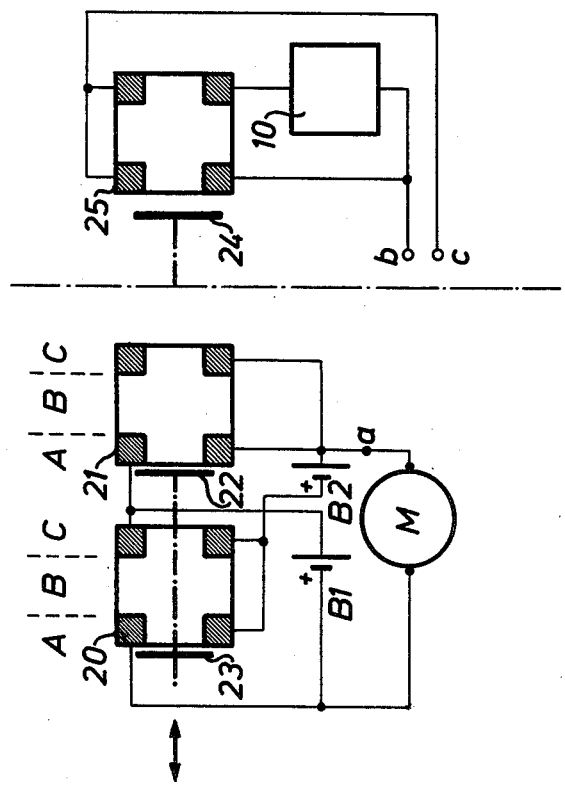

FIG. 3 is a fundamental representation of the speed control member and the appertaining switching member. On two cards 20 and 21 all the corners are provided with contact surfaces adapted to come into engagement with sliding contacts 23 and 22, respectively, of electrically conductive material belonging to either card. The contact surfaces are firmly connected to the battery pole and to the motor in the way as shown. The sliding contacts are adapted to slide on the cards and are rigidly mechanically connected with each other and with a wire (not shown) connected to a control. A spring (not shown) returns the sliding contacts to the starting position illustrated in the figure in which batteries B1 and B2 and motor M are disconnected. When the control handle is operated sliding contact 22 and 23 initially will come into engagement with contact surfaces (position A) at the left-hand side of the respective cards, whereby the batteries are parallel-connected with each other and with the motor. When the sliding contacts are shifted to position B on the respective card all connections between the batteries and the motor will be broken and when the sliding contacts are moved to position C the contacts establish electrical connection between the right-hand contact surfaces on each card and the batteries are connected in series with the motor. If thyristor control is desired the conductor to the motor is broken at point a and the circuit to the right in FIG. 3 is connected with points b and c across the break at a. This circuit comprises a corresponding card 25 and a corresponding sliding contact 24 which is mechanically connected to 22 and 23.

The speed control member may also comprise a number of program discs which are fixed to a rotatable shaft. The program discs are provided with notches, protrusions or the like adapted to cooperate with microswitches which for example operate the relays shown in FIGS. 1 and 2. The shaft is driven by a cog-wheel engaged by a rack. The one end of the rack is connected to a wire leading to a control handle. The end of the rack is connected to a tension spring tending to return the rack when the control handle is released.

According to a third embodiment of the invention the switches and the speed control member may comprise a knife switch member. The knife of the knife switch member is operated by a conventional, returning foot gear treadle adapted to take different control positions. In each control position the knife is in engagement with a contact member. During the stepwise movement of the foot gear treadle the contact means perform the same connecting program as the switching members shown in FIGS. 1, 2 and 3. When the electrically driven vehicle is a transport motor bicycle it may be suitable to add a reverse-motion position for the speed control member in which reverse motor position the terminals of the motor are exchanged.

The above described embodiments of the speed control member can be modified in order to permit mutual connection, on the one hand, of a desired number of batteries in the desired patterns for each successive control position and, on the other hand, of the battery patterns to the motor.

Figure 4:
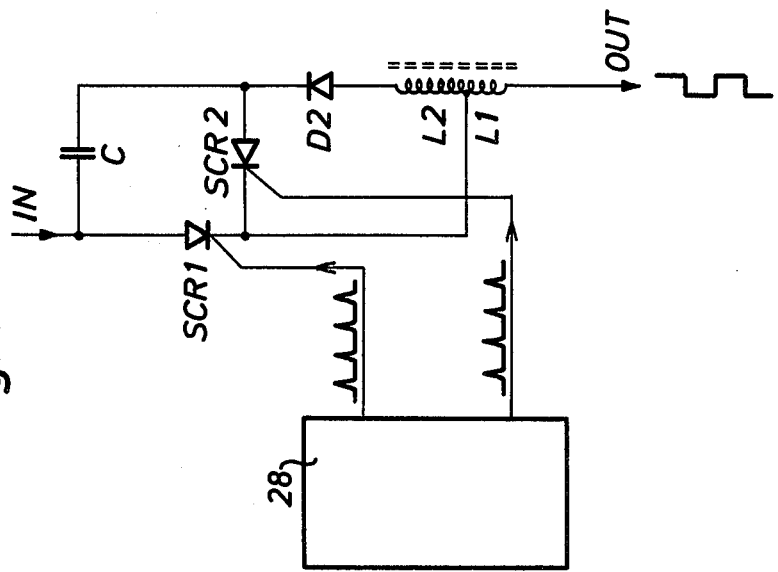
FIG. 3 represents the speed control member and
FIG. 4 is a circuit diagram of the thyristor member with the trigger circuit thereof shown in block form.

In FIG. 4 there is shown a circuit diagram of the thyristor member SCR1 and its control circuit 28, L1, L2, D2, SCR2, C. Block 28 is a trigger circuit delivering two series of trigger pulses in which the pulses in the one series are displaced in time in relation to the trigger pulses of the other series. The battery current is supplied at IN and is chopped by the main thyristor SCR1 and is discharged to the motor at OUT. When a triggering pulse is applied to the control of SCR1 it will be rendered conductive and in the one partial winding L1 of an autotransformer there is produced a current flow which induces a voltage in the other partial winding L2, this voltage in turn charging capacitor C via a diode D2. The charge of C is maintained until SCR2 is triggered. When SCR2 is triggered the voltage across SCR1 is reversed and SCR1 is extinguished. When SCR1 is extinguished the current through SCR2 is zero and SCR2 is extinguished. This type of thyristor circuit is known under the designation Jones' Chopper.

It is to be noted that the thyristor member and appertaining switching means therefor can be dispensed with completely in the vehicle according to the present invention. Tests have shown that the radius of action of an electrically driven motor bicycle provided with the voltage control system according to the present invention and with the thyristor member increases by about 30 percent in comparison with the same motor bicycle without the thyristor member.

If a fault should arise in some switching member in the embodiment according to FIGS. 1 and 2 the vehicle will not be put out of operation but may always be run at "half-speed" (batteries connected in parallel).

The above described embodiments of the invention may be modified and varied in many respects within the frame of the basic inventive idea.

What I claim is:

1. In an electrically driven vehicle including an electric driving motor having a pair of driving voltage terminals and arranged to rotate at a rate proportional to the voltage across its terminals, and a plurality of vehicle-borne, rechargeable electrical power sources each arranged to supply current at a predetermined nominal voltage, the improvement comprising: speed control switching means connected between said sources and said motor terminals and switchable between a plurality of switching positions each connecting said sources in a respective configuration which provides a respectively different total supply voltage, said switching means being composed of interconnecting means which, at a first switching position, connect said sources together in parallel and establish a first current flow connection pattern, which is bidirectionally conductive, between the parallel arrangement of said sources and the terminals of said motor, and, for a second switching position, connect said sources together in series and establish a second current flow connection pattern between the series arrangement of said sources and the terminals of said motor, whereby switching from said second position to said first position automatically causes said motor to begin operating as a generator and to recharge said sources as long as said motor is rotating at a rate higher than that proportional to the voltage supplied by said sources when connected together in parallel and to recommence operating as a motor when the rate of rotation thereof reaches the value proportional to the voltage supplied by said sources when connected together in parallel, said interconnecting means constituting means which establish, when said switching means are in said first switching position, a conductive path which causes, during operation of said motor as a generator, the entire available charging energy therefrom to be fed into said sources; a thyristor switch; a triggering circuit connected to said thyristor switch for rendering the latter alternately conductive and non-conductive at a fixed, predetermined rate which is independent of the speed or output loading of said motor; switchable shunting means connected in parallel with said thyristor switch; and further interconnecting means connected to said switching means for connecting said thyristor switch in series between said motor and said sources and rendering said shunting means non-conductive whenever said switching means is in its second switching position and for rendering said shunting means conductive whenever said switching means in in its first switching position.

2. Electrically driven vehicle as claimed in claim 1 wherein said switching means include relays which altenatively are fed by one or several of said sources or one or several separate sources.

3. Electrically driven vehicle as claimed in claim 1 wherein said switching means include solid state components.

4. Electrically driven vehicle as claimed in claim 1 wherein said switching means comprise contact surfaces provided on cards or the like.

5. Electrically driven vehicle as claimed in claim 4 wherein said switching means performing the mutual interconnection of said sources are actuated prior to said switching means performing the connection of said sources to said motor.

6. Electrically driven vehicle as claimed in claim 4, wherein said switching means comprises movable slides adapted to cooperate with said contact surfaces.

* * * * *